Figure 1:
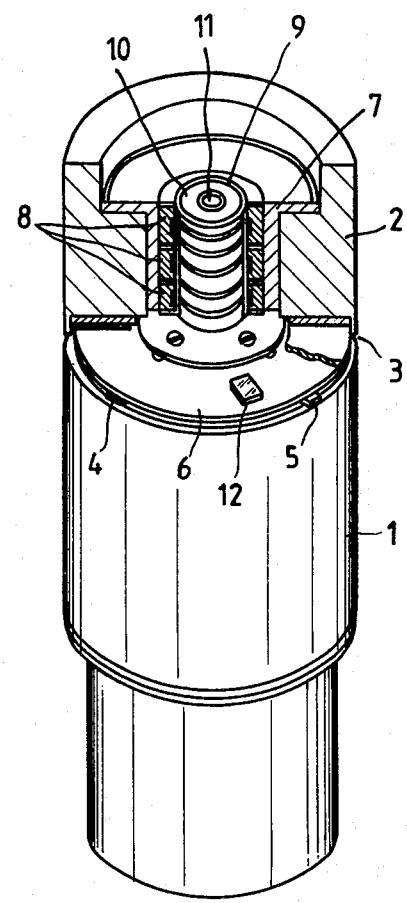

United States Patent [19]
Heitmann

[11] 4,455,584
[45] Jun. 19, 1984

[54] DIGITAL SIGNAL MAGNETIC RECORDING SYSTEM

[75] Inventor: Jürgen Heitmann, Seeheim, Fed. Rep. of Germany

[73] Assignee: Robert Bosch GmbH, Stuttgart, Fed. Rep. of Germany

[21] Appl. No.: 323,381

[22] Filed: Nov. 20, 1981

[30] Foreign Application Priority Data

Dec. 3, 1980 [DE] Fed. Rep. of Germany ....... 3045544

[51] Int. Cl.³ .......................... G11B 5/52; G11B 21/04
[52] U.S. Cl. ...................................... 360/108; 360/84; 360/130.24
[58] Field of Search ..................... 360/60–70, 360/39, 46, 104, 107, 108, 109, 110, 129, 130

[56] References Cited

U.S. PATENT DOCUMENTS

| 4,005,483 | 1/1977 | Kuwano | 360/63 X |
| 4,249,219 | 2/1981 | Aoi et al. | 360/46 |
| 4,293,880 | 10/1981 | Tsukada et al. | 360/64 X |
| 4,319,294 | 3/1982 | Repp | 360/107 |

FOREIGN PATENT DOCUMENTS 2810706  9/1979  Fed. Rep. of Germany .

Primary Examiner—Aristotelis M. Psitos
Assistant Examiner—K. Wong
Attorney, Agent, or Firm—Frishauf, Holtz, Goodman & Woodward

[57] ABSTRACT

To permit recording of digital data in a digital code using d-c level, particularly for recording of digital video data by a rotating video transducer (4, 5, 29) on a rotating head wheel (6) of a scanner, without degradation of recorded signals due to d-c shift upon an extended sequence of bits of the same polarity, two current generators (30, 31) are provided, each supplying a current of opposite polarity, connected to a logic circuit which connects, selectively, current of the respective polarity in accordance with the respective bit to the transducer, so that, at each time, and corresponding to the respective bit, the current through the transducer will be of sufficient magnitude to change the magnetic properties of the magnetic tape (T), then in contact with the transducer, to saturation in the direction controlled by the direction of current flow through the transducer head. A d-c restoring clamping circuit (27) and logic control circuit (34, 35) to control the current switches (32, 33) is located as a unit (12) on the head wheel (6) itself, which receives the signals via non-contacting transducers (9, 23, 24). A non-contacting power supply (26, 40) transfers power from the stator (20) to the rotor (21) of the scanner (1, 2).

14 Claims, 2 Drawing Figures

DIGITAL SIGNAL MAGNETIC RECORDING SYSTEM

The present invention relates to the recording of digital signals on a magnetic carrier, typically magnetic tape, and more particularly to recording of digital video signals on a magnetic tape which is looped about a cylindrical scanner in a spiral path, so that digital video signals can be recorded thereon in the form of inclined parallel magnetic tracks.

BACKGROUND

Magnetic tape recording is used not only for analog but also for digital signals. Digital signal recording on magnetic tape is used widely in connection with data processing apparatus. Increasingly, the recording of video signals is carried out by converting received analog video signals into digital form, and recording the digitized video signals on magnetic tape on inclined tracks.

Various types of codes can be used for recording digital signals. Basically, two types of codes are used, one which is free from a d-c level, and another one which includes a d-c level. In the d-c level codes, for example the NRZ code, it is possible that sequences of bits of the same polarity may cause a shift in the d-c level upon processing of the data. For example, if twenty or more bits of the same polarity, that is, logic 0 or logic 1 appear sequentially, shift of the base line, that is, of the reference voltage level, may occur. Such drift phenomena then can cause difficulty if a subsequent bit of a different polarity occurs, since the base line has been shifted by the extensive sequence of similar bits to such an extent that the control of the magnetic recording medium, typically magnetic tape, is distorted in such a manner that the desired positive or negative magnetization to saturation of the magnetic medium can no longer be reached. D-C codes have the advantage, however, that processing of the data is simplified and requires less equipment and apparatus than processing of similar data in codes without a d-c content.

The Invention

It is an object to provide a method and system to improve magnetic recording of digital data, and especially magnetic recording of digitized video signals using a d-c bias code.

Briefly, the signals are applied, prior to recording, to a control circuit which includes a d-c restoring circuit, for example a reference voltage clamping circuit of constant-current circuits which apply, in accordance with the received signals, a constant reference voltage or, rather, a constant externally generated current to a recording head, so that the recording head is always and reliably controlled to have recording current flow therethrough which insures magnetization to saturation of the discrete magnetic areas beneath the recording head in accordance with the logic value of the bit. The circuit elements of the control circuit are physically located on the head wheel of the scanner. Thus, by introducing an external recording current, controlled to generate magnetic fields, for recording on magnetic tape, in the respective direction and always of sufficient intensity to reliably insure magnetization to saturation in accordance with the respective direction of magnetization, as controlled by the bits, drift upon recording, even if a substantial sequence of bits of the same sign occurs, is reliably avoided.

The system has the advantage that d-c containing codes can be used without difficulty due to base-line shift or drift.

The invention is particularly applicable to video recording. A rotor, forming part of the head wheel of the scanner, and carrying at least one recording head, has a constant current switching source located thereon which supplies to the recording head, respectively, the requisite current to effect positive or negative saturation of the tape being guided in contact with the recording head. In accordance with a feature of the invention, and which is particularly preferred, the two switching states of the magnetic field generated by the recording head are obtained by providing two current sources furnishing current of sufficient intensity to the recording head and in respectively different directions, which are so controlled that, to record one bit, one current source is enabled, and, to record another bit, the other current source is enabled, or both are enabled, the other current source then supplying a current of sufficient magnitude to override the direction of the first.

DRAWINGS

Figure 2:
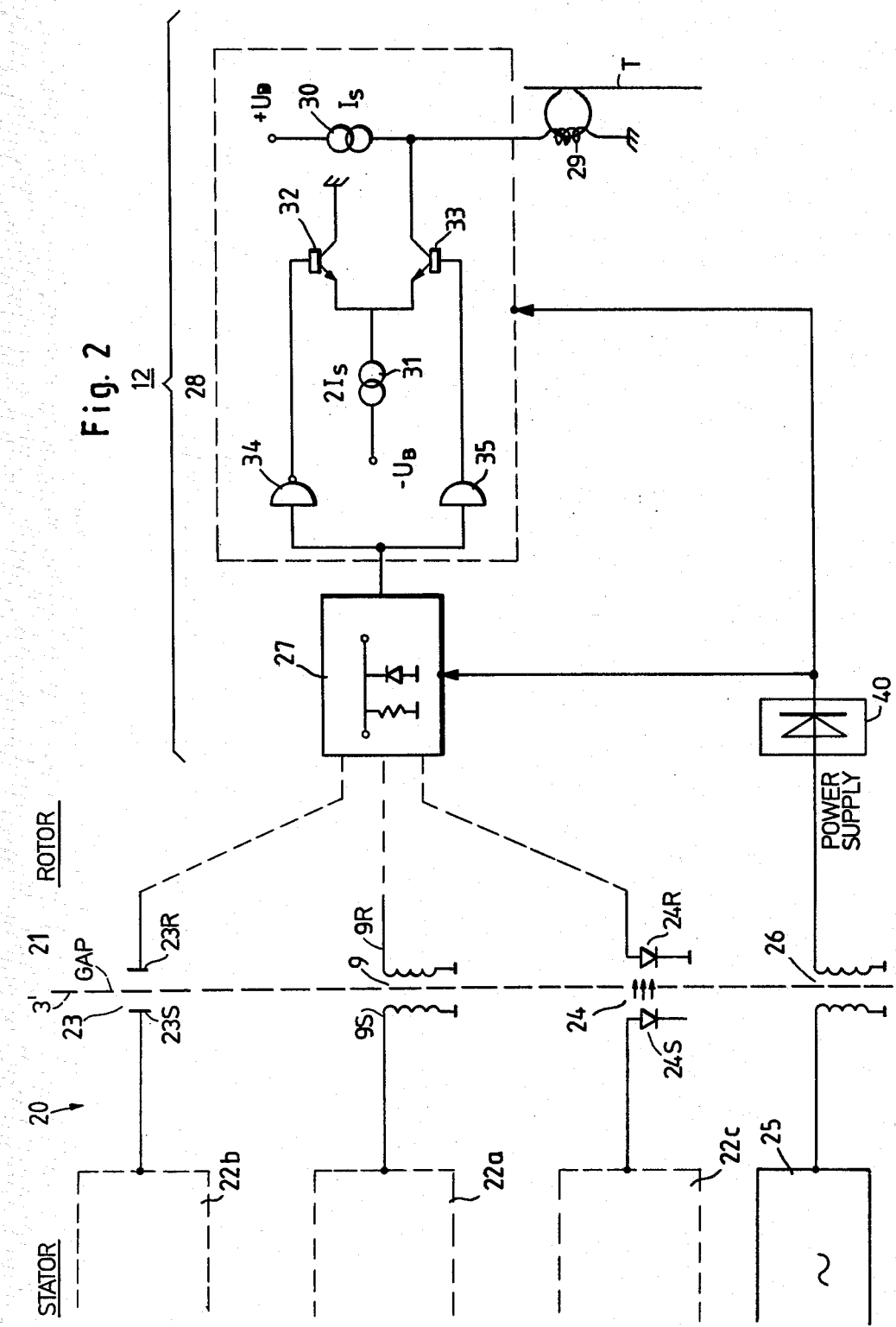

FIG. 1 is a pictorial representation of a typical video tape scanner, partly broken away, to illustrate features within the scanner; and FIG. 2 is a general block circuit diagram illustrating those circuit components necessary for an understanding of the present invention.

The scanner 1—FIG. 1—can be of a type well known in the video tape recording field and, generally, has two cylinders 1, 2 between which a gap 3 is arranged in which a head wheel 6 is positioned to rotate. The cylinders 1, 2 are guide cylinders and retain an insert 7 in which the rotating element 10 is positioned. Head wheel 6 is located on the rotating element 10. The head wheel carries electromagnetic heads 4, 5. The arrangement is so made that the head wheel 6, with the electromagnetic transducers 4, 5, rotates within the narrow gap 3, the tape being guided about the cylinder portions 1, 2 in a spiral path so that the magnetic heads 4, 5 will record on the tape in parallel tracks which are inclined with respect to a longitudinal edge of the tape. The signals to be recorded are applied to the heads 4, 5 by non-contacting transmission elements 9. Transmission elements 9 have a stator portion 8, located in the part 7 of the scanner, and a rotor portion on the rotor 10. Rotor 10 rotates about or with shaft 11. Video tape scanners of this general construction are known, see, for example, German Patent Disclosure Document DE-OS 28 52 167, to which U.S. application Ser. No. 96,161, REPP, now U.S. Pat. No. 4,319,294, assigned to the assignee of this application, corresponds.

Inductive transfer of signals to be recorded via the inductive transducer 9 is only one example of signal transfer; signals can be transferred, also, in non-contacting manner in other ways, for example by capacitors or by optical means, having, respectively, two components or elements, one on the fixed stator portion 7 and the other on the rotor 10.

If a system is used as shown and described in connection with FIG. 1, and if, when using a d-c containing code, an extended sequence of bits of the same phase may cause a shift or drift in the base line of the digital signal to be recorded. This shift occurs since the rotating receiving component of the signal is connected to the transducer heads 4, 5, respectively.

In accordance with the present invention, a d-c transducing unit 12 is provided, positioned in accordance with a feature of the invention on the head wheel 6 itself, which rotates with the head wheel 6. This unit 12 includes a reference voltage clamping circuit—which may be of a type known by and itself—which is provided in order to restore the reference voltage of the digital signal which is to be recorded or, respectively, to restore a reference d-c voltage, or a reference d-c current. Positioning the unit 12 on the head wheel 6 has the advantage that any influence which might shift the base line, and which are due to contactless transmission of signals from the stator element 7 to the rotor 10, are compensated. If the digital signals to be recorded always have their appropriate distance with respect to a d-c reference level, for example a d-c reference voltage, then the magnetic medium, in the case illustrated, the magnetic tape, can be controlled to saturation without linearity errors. If the digital signal to be recorded drifts with respect to its base line, a field will be generated in the transducers 4, 5 depending on the direction of drift, which is stronger than that which is necessary to obtain magnetization to saturation of the magnetic tape. A bit which then follows in the opposite direction may not be able to bring the tape to saturation in the opposite direction.

Of course, unit 12 has been shown in FIG. 1 only schematically. It should be so constructed that, upon rotation of the head wheel 6, it will remain in dynamic balance. Unit 12, therefore, should have a counterpart or counterweight diametrically opposite so that the head wheel will remain in precise balance.

The electrical circuit is shown in FIG. 2. The element to the left of the borken line 3' is the stator 20, the element to the right is retained on the rotor 21. Line 3' thus schematically illustrates the gap between the elements 7, 10 of FIG. 1. All the elements at the right of the gap 3' rotate with the head wheel 6.

FIG. 2 also shows three different ways of transferring signals in non-contacting manner between the stator 20 and the rotor 21. All three systems can be used on one rotor, and have been so shown, thereby preventing interaction; of course, in other arrangements, the three systems may be identical for any one rotor. The inductive transducer 9—see also FIG. 1—has a stator coil 9S and a rotor coil 9R. The stator coil 9S of the inductive transducer 9 is connected to and controlled by a signal source 22a which, for example, is the final output stage of a digital video amplifier. A capacitative transducer 23 is provided having a stator capacitor electrode 23S and a rotor capacitor electrode 23R. The stator electrode 23S is connected to the output amplifier 22b. Opto-electronic transfer of data may also be used; stator optoelectronic light generator 24S, for example a light-emitting diode (LED), is connected to the output amplifier 22c of, for example, digital video recording apparatus, the rotor portion utilizing a light-sensitive diode 24R.

In addition to the signal transfer elements 9, 23, 24, it is also necessary to provide a power supply to the unit 12 on the rotor. Accordingly, a non-contacting transformer 26 having stator and rotor coils is located, respectively, on the stator and rotor 20, 21. Transformer 26 receives power from a power supply 25. For utilization, the power is preferably rectified, as shown schematically by rectifier 40. Actually, rectifier 40 may be of any suitable construction, for example a full-wave rectifier. Filter capacitors and the like have been omitted for clarity, since the power supply may be in accordance with any well known and standard arrangement. The inductive transformer 26 is shown as a separate unit; it may, of course, also be combined if an inductive transducer 9 is used, to form therewith a single structural unit; separation between power supply and information content of the electrical energy can be obtained by any well known circuit components, for example filters, diodes, and the like.

The digital signal to be recorded is applied from output amplifiers 22a, 22b, 22c to the respective contactless transducers, and from the rotor portions 9R, 23R, 24R, respectively, to a reference clamping circuit 27. Such circuits are known; FIG. 2 illustrates one typical arrangement which includes the parallel circuit of a resistor and a diode, indicating, generally, that the diode clamping always retains the lowest voltage applied, and any positive voltage applied thereto is built thereon. Such reference clamping circuits to restore a reference d-c voltage are well known in television circuitry and are generally referred to as "black level control". One such circuit arrangement is described in German Patent Disclosure Document DE-OS 28 10 706. Other types of clamping circuits may be used, also much more complex circuitry, in order to restore the d-c voltage level; such circuits are generally known also as d-c restoration circuits.

In accordance with the present invention, the reference clamping circuit 27 is connected to a current switching unit 28 which provides the magnetization current for transducer head 29. Transducer head 29 corresponds, for example, to transducer head 4 or 5, respectively. Current switch 28 has two current sources. A first current source 30 provides a current $I_s$, current source 30 being connected to a source of positive supply voltage $U_B$, and serially through the transducer head 29 to ground, chassis or reference potential. The voltage $U_B$ is supplied from a power supply 40. The current switch 28 further contains a second current source 31 which provides a base current $2I_s$, connected to a voltage source which is negative with respect to the reference, as shown $-U_B$. The current source 31 is connected to the emitters of two switching transistors 32, 33, respectively. Switching transistor 32 has its collector connected to ground or reference potential; switching transistor 33 has its collector connected to the junction between current source 30 and the recording head 29. Switching transistors 32, 33 are controlled to conduction, or blocking state, respectively, by a logic circuit including logic gates 34, 35. Gate 34 is a mere inverter, gate 35 is a single-input AND-gate or a buffer. Of course, equivalent circuitry can be used, for example a flip-flop with complementary outputs, or other equivalent circuitry. The logic circuit has its input connected to the output of clamping circuit 27.

Operation: Current is continuosuly supplied to the recording head 29 from the current source 30. Consequently, the current $I_s$ continuously flows from the positive reference current source to ground or chassis through the recording head 29. Failing any other current, magnetic tape T (FIG. 2), and positioned in magnetic transducing relationship to the head 29, will receive a positive magnetic field. The level of the current $I_s$ is so adjusted that the magnetic tape is saturated magnetically to magnetic saturation.

Gates 34, 35 control the transistors 32, 33 so that in dependence on the polarity of the digital output signal from the reference voltage clamping circuit 27, either one of the transistors 32, 33 is conductive, the other being controlled to blocking or OFF state since the logic gate 34 inverts, whereas the logic gate 35 does not. Let it be assumed that the transistor 32 is conductive. Current from source 31 at the level of $2I_s$ flows from negative voltage supply $-U_B$ to ground or chassis terminal. The current from source 30 through the magnetic head 29 thus is not affected at all, since transistor 33, simultaneously, has blocked. If, however, the output from circuit 27 is such that the transistor 33 is controlled to conduction and transistor 32 is turned OFF, current at the level of $2I_s$ is switched to flow through the magnetic head 29 to ground or chassis, and thus is superimposed upon the current from the current source 30. The resulting current through the head 29 will be $-I_s$. The switch 28, thus, has the effect that, in dependance on the polarity of the output signal of the reference clamping circuit 27, the current through the recording head 29 varies between the level $+I_s$ and $-I_s$, that is, in either case, is always sufficient for saturation without drift.

The reference voltage clamping circuit 27 provides a definitive and uniform relationship with respect to reference voltage; the current switch 28 insures that the magnetization current through the transducer element 29, however, at all times will be sufficient to drive the respective incremental area of the tape T beneath the transducer head to saturation in the respective direction.

The system and method thus results in error-free recording of digital data on a magnetic recording medium, as shown, the tape T, and permits use also of such codes which have a relatively high d-c voltage content. Thus, simplified circuitry for data processing can be used without, however, interfering with recording of data on the tape T.

Circuit components used in connection with circuits of this type, well known as such, and not necessary for an understanding of the invention have been omitted; thus, buffer amplifiers, current limiting resistors, and the like, have been omitted for clarity; their use is obvious in accordance with standard engineering practice.

Various changes and modifications may be made, and features described in connection with the illustrated embodiment may be used singly or in combination within the scope of the inventive concept.

For example, a single current switching unit 28 may be provided connected to all the transducer heads; if more than one transducer head is in contact with the tape at any time, however, separate current sources are preferably provided to eliminate the necessity of switching. The two independent current sources are connected to eliminate ON-OFF switching of the current sources themselves, so that the rise time of current flow through the transducer 29 will be unaffected by switching transients of individual current flow through the respective sources 30, 31, since, as shown, the current sources 30, 31 are continuously connected to supply current at all times, switching being effected only by the switches 32, 33 functioning as current steering switches.

I claim:

1. Digital signal magnetic recording system to record digital signals on a magnetic recording medium,
    having a tape scanner (1, 2) including a rotating head wheel (6);
    at least one recording head located on the head wheel,
    in which the digital signals are applied to an input (20, 22a, 22b, 22c) to energize the recording head (4, 5, 29),
    a two-element non-contacting signal transfer means (9, 23, 24), one element (9S, 23S, 24S) of which is coupled to the input, and the other (9R, 23R, 24R) is coupled to the head (29), said elements of the signal transfer means (9, 23, 24) being located, respectively, on a stationary (7) and a rotating (10) portion of the scanner,
    and comprising
    circuit means (27, 28) located on the rotating portion (10) of the scanner for restoring the d-c level of the digital signals interconnected between the other element (9R, 23R, 24R) of said signal transfer means (9, 23, 24) and the transducer (29).

2. System according to claim 1, wherein said restoring circuit means (27, 28) is located on the head wheel (6) of the scanner.

3. System according to claim 1, wherein said restoring circuit means includes a reference voltage clamping circuit (27).

4. System according to claim 1, wherein said d-c level restoring circuit means includes a current switch (28); and
    means (30, 31) for providing positive saturation current and negative saturation current, respectively, to the transducer (29), said current switch being connected to connect, selectively, the respective saturation current from the respective current supplying means to the transducer head.

5. System according to claim 4, wherein said current supply means includes a first current source (30) supplying a first current $(I_s)$ of a value sufficient to effect saturation of the magnetic medium (T) by the transducer (29) in a first direction;
    and a second current source (31) providing a current $(-I_s)$ of a sign opposite that of the first current $(+I_s)$ from the first current source, and of a value twice that of the current supplied by the first current source (30);
    and wherein said current switch (28) is effective to connect, in one position, current from only the first current source (30) to the transducer (29), and in another position current from both said current sources, in parallel, to the transducer head, whereby, upon superposition of currents, the current flow through the transducer head will reverse, without interruption of current flow from said current supply sources (30, 31) themselves.

6. System according to claim 1, wherein said d-c level restoring circuit means includes a current switch (28); and
    means (30, 31) for providing positive saturation current and negative saturation current, respectively, to the transducer (29), said current switch being connected to connect, selectively, the respective saturation current from the respective current supplying means to the transducer head.

7. System according to claim 6, wherein said current supply means includes a first current source (30) supplying a first current $(I_s)$ of a value sufficient to effect saturation of the magnetic medium (T) by the transducer (29) in a first direction;
    and a second current source (31) providing a current $(-I_s)$ of a sign opposite that of the first current ($+I_s$) from the first current source, and of a value twice that of the current supplied by the first current source (30);

and wherein said current switch (28) is effective to connect, in one position, current from only the first current source (30) to the transducer (29), and in another position current from both said current sources, in parallel, to the transducer head, whereby, upon superposition of currents, the current flow through the transducer head will reverse, without interruption of current flow from said current supply sources (30, 31) themselves.

8. System according to claim 6, further including non-contacting power transfer means (26) secured, respectively, to the stationary portion of said scanner and to the rotating portion of the scanner, and providing operating power for said saturation current providing means (30, 31).

9. System according to claim 7, further including non-contacting power transfer means (26) secured, respectively, to the stationary portion of said scanner and to the rotating portion of the scanner, and providing operating power for said saturation current providing means (30, 31).

10. System according to claim 1, further comprising a non-contacting transformer (26) having non-contacting stator and rotor coils located, respectively, on the stationary (7) and rotating (10) portion of the scanner, the rotating coil being connected for supplying operating power to the restoring circuit means (27, 28) of the rotating portion (10) of the scanner.

11. System according to claim 10, further including a rectifier (40) located on the rotating portion of the scanner and electrically interposed between the rotor coil of the non-contacting transformer and the restoring circuit means (27, 28).

12. System according to claim 3, further comprising a non-contacting transformer (26) having non-contacting stator and rotor coils located, respectively, on the stationary (7) and rotating (10) portion of the scanner, the rotating coil being connected for supplying operating power to the restoring circuit means (27, 28) of the rotating portion (10) of the scanner.

13. System according to claim 4, further comprising a non-contacting transformer (26) having non-contacting stator and rotor coils located, respectively, on the stationary (7) and rotating (10) portion of the scanner, the rotating coil being connected for supplying operating power to the restoring circuit means (27, 28) of the rotating portion (10) of the scanner.

14. System according to claim 6, further comprising a non-contacting transformer (26) having non-contacting stator and rotor coils located, respectively, on the stationary (7) and rotating (10) portion of the scanner, the rotating coil being connected for supplying operating power to the restoring circuit means (27, 28) of the rotating portion (10) of the scanner.

* * * * *